United States Patent
Bihya

(10) Patent No.: US 7,419,027 B2
(45) Date of Patent: Sep. 2, 2008

(54) SYSTEM AND METHOD OF INCREASING SAFETY TO OCCUPANTS IN A VEHICLE

(75) Inventor: Jama Bihya, La Prairie (CA)

(73) Assignee: Motorola, Inc., Schaumburg, IL (US)

( * ) Notice: Subject to any disclaimer, the term of this patent is extended or adjusted under 35 U.S.C. 154(b) by 346 days.

(21) Appl. No.: 11/215,091

(22) Filed: Aug. 30, 2005

(65) Prior Publication Data

US 2007/0046451 A1    Mar. 1, 2007

(51) Int. Cl.
*B60D 1/28* (2006.01)

(52) U.S. Cl. .................................... 180/271

(58) Field of Classification Search ............. 180/271, 180/272, 287; 340/428
See application file for complete search history.

(56) References Cited

U.S. PATENT DOCUMENTS

| | | | |
|---|---|---|---|
| 6,300,869 B1* | 10/2001 | White et al. | 340/457 |
| 6,922,622 B2* | 7/2005 | Dulin et al. | 701/45 |
| 2007/0158128 A1* | 7/2007 | Gratz et al. | 180/287 |

* cited by examiner

*Primary Examiner*—Faye M. Fleming
(74) *Attorney, Agent, or Firm*—Thomas V. Miller; Terri S. Hughes

(57) ABSTRACT

A method of increasing safety to occupants in a vehicle, the method comprising, monitoring an input from a user that identifies a presence of a non-autonomous entity; storing information relating to the presence of the non-autonomous entity; and, warning the user about the presence of the non-autonomous entity when a predetermined condition exists.

17 Claims, 6 Drawing Sheets

SYSTEM AND METHOD OF INCREASING SAFETY TO OCCUPANTS IN A VEHICLE

FIELD OF THE INVENTION

The present invention relates generally to monitoring and detection systems that provide increased safety to occupants in a vehicle, and work in conjunction with a warning system that may be local or remote.

BACKGROUND OF THE INVENTION

Safety is an important factor that consumers consider when purchasing a vehicle. To cater to these needs, automotive manufacturers are designing systems that enhance safety and security of the occupants of the vehicle. These designs, however, are typically targeted toward keeping occupants safe when the vehicle is moving or involved in an accident such as driver assistance systems, seat belt warning systems, and air bag deployment systems.

A need exists for increasing the safety of occupants when a vehicle is parked or lengthily started, but not moving. This is particularly important with respect to infants, handicapped or unconscious persons i.e. with non-autonomous occupants of a parked car. Unfortunately, there have been several reports recently of infants that have been left behind in a parked vehicle, and consequences of such negligence have been fatal. The infant died because of extreme environmental conditions that can arise in a parked vehicle. In another case, an infant seated in a started but not moving vehicle, while his father was shoveling the snow, died because of the toxic gas infiltration.

As mentioned above, there are a variety of situations where a non-autonomous person is left alone in the parked vehicle, with real risks that can result in tragic consequences. Such situations can be a result of forgetfulness, or may be caused by misevaluation of dangers of temporarily leaving the infant or the non-autonomous person alone in the vehicle. Finally, some situations may be due to a crash of the vehicle or a sudden indisposition of a driver of the vehicle that makes the driver loose consciousness, thereby becoming a non-autonomous occupant of the vehicle. In all these situations, the vehicle is not moving and a non-autonomous occupant exists inside the vehicle.

Though the situations as mentioned above occur rarely, the consequences of such situations are always tragic. In case of a vehicle in motion, there is a high probability that witnesses, though in some reasonable delay, will transmit an event of an accident or a crash. Therefore, adequate rescue resources are notified with minimum delay. On the other hand, in case of a parked or more generally a vehicle that is not moving, when the occupant's life is in danger, the probability that the dangerous event will be transmitted is very low.

Existing systems that could be related to implementation of safety measures in a parked vehicle consist of systems for controlling an interior temperature in a vehicle that respond to variations in temperature external to the vehicle. Further, systems exist that provide monitoring and control systems for remotely controlling undesirable climate condition inside a vehicle.

BRIEF DESCRIPTION OF THE FIGURES

The accompanying figures together with the detailed description below are incorporated in and form part of the specification, serve to further illustrate various embodiments and to explain various principles and advantages all in accordance with the present invention.

DETAILED DESCRIPTION OF THE INVENTION

Figure 1:
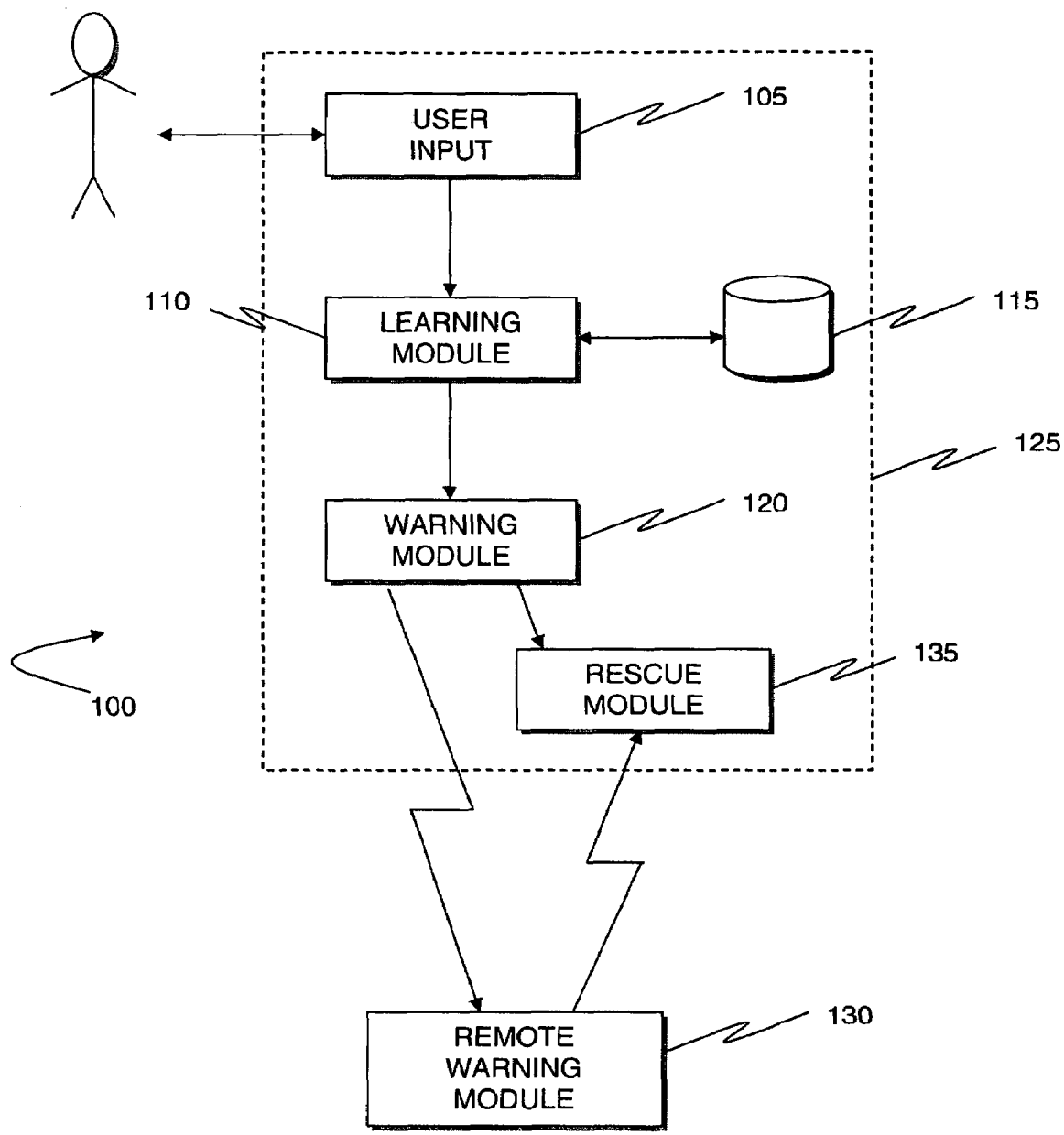
FIG. 1 illustrates a block diagram of a system for increasing safety of a non-autonomous entity in a vehicle in accordance with embodiments of the present invention.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention relates to a system and a method of increasing safety to occupants in a vehicle. An embodiment of the invention includes detecting a presence of a non-autonomous entity in a parked or lengthily started but not moving vehicle. After detecting the presence, it generates a warning, an alarm and ultimately triggers an action that can help attenuate a potential hazardous situation. Those of skill in the art with the benefit of this specification will appreciate that the system can be implemented using different technologies, including optical and mechanical detection sensors, a computer voice interface technology and a wireless communication technology.

Referring now to FIG. 1, a system 100 in a vehicle 125 is adapted to increase the safety of a non-autonomous entity. In one embodiment, the system 100 may comprise a user input 105, a learning module 110, a memory 115, a warning module 120, and a rescue module 135. The individual components of the system 100 may be housed within a single housing or distributed throughout the vehicle 125. The user input 105 allows a driver of the vehicle 125 to identify a presence of a non-autonomous entity in the vehicle. The non-autonomous entity can be an infant, or a handicapped or an unconscious person or an inanimate object such as a file or a non-human but living creature such as a pet animal in a parked or lengthily started but not moving vehicle.

Figure 2:
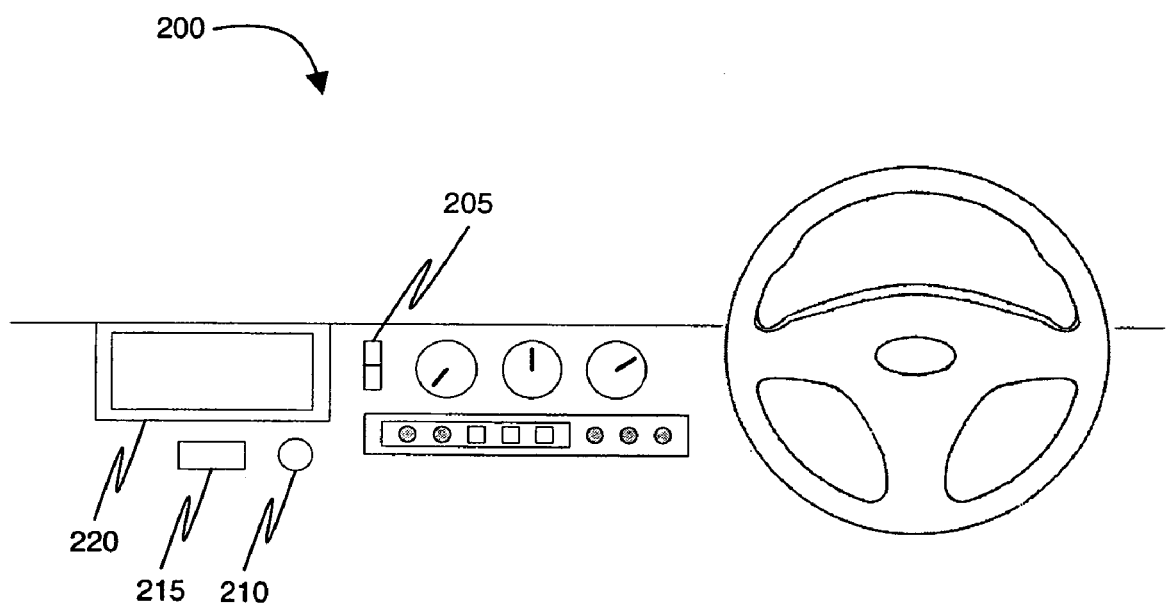
FIG. 2 illustrates exemplary embodiments of a user input for registering the presence of a non-autonomous entity in accordance with embodiments of the present invention.
Figure 3:
FIG. 3 illustrates another embodiment of a user input that includes a seat belt sensor for storing the presence of a non-autonomous entity in accordance with embodiments of the present invention.

In one embodiment, as shown in FIG. 2, the user input 105 may include a button 205 provided in a vehicle. Here, the button 205 may register the presence of a non-autonomous entity. The button 205 may be monitored by the system 100 and when pushed, the learning module 110 registers information of the presence of the non-autonomous entity inside the vehicle. In another embodiment of the invention, the user input 105 may include a microphone 210 and a voice recognition module 215 that are configured to process a verbal identification of the presence of the non-autonomous entity. A text-to-speech converter (not shown) can be provided to enable easy storage of voice information of the non-autonomous entity in a text form. Further, in yet another embodiment of the invention, as depicted in FIG. 3, the user input 105 may be a seat belt sensor 305 associated with a seat belt 310 that registers the presence of a non-autonomous entity in accordance with embodiments of the present invention. Those of skill in the art with the benefit of this specification would appreciate that the methods for the user input 105 mentioned herein are not exhaustive and it may be implemented by many other methods.

The learning module 110 learns the presence of a non-autonomous entity in a vehicle and stores any inputs from the user input 105 in memory 115. This allows the system 125 to know the presence of a non-autonomous entity in the vehicle. For instance, with respect to the embodiments shown in FIGS. 1 and 2, the learning module 110 may learn of the presence of a non-autonomous entity when a driver presses the button 205 or provides a verbal indication through the microphone 210 and the voice recognition module 215. With respect to the embodiment shown in FIG. 3, the system 125 may memorize that a seat belt 310 has been fastened by monitoring sensor 305. This information may not mean that a non-autonomous person is inside a vehicle, but can eventually convey, when the vehicle has been parked and the seat belt 310 remains fastened after a predetermined period of time.

The warning module 120 is configured to issue a warning about the presence of the non-autonomous entity when a predetermined condition exists. The predetermined condition can relate to a situation denoting that the vehicle is parked or lengthily started but not moving, and the non-autonomous entity is in an unsafe situation and is unable to overcome the unsafe situation. The warning will trigger an actions that will help attenuate any potentially hazardous consequences arising from the inability of the non-autonomous person to overcome the unsafe situation. The warning module can be a local warning module 120 or a remote warning module 130. Further, the warning module may comprise an alarm.

Figure 4:
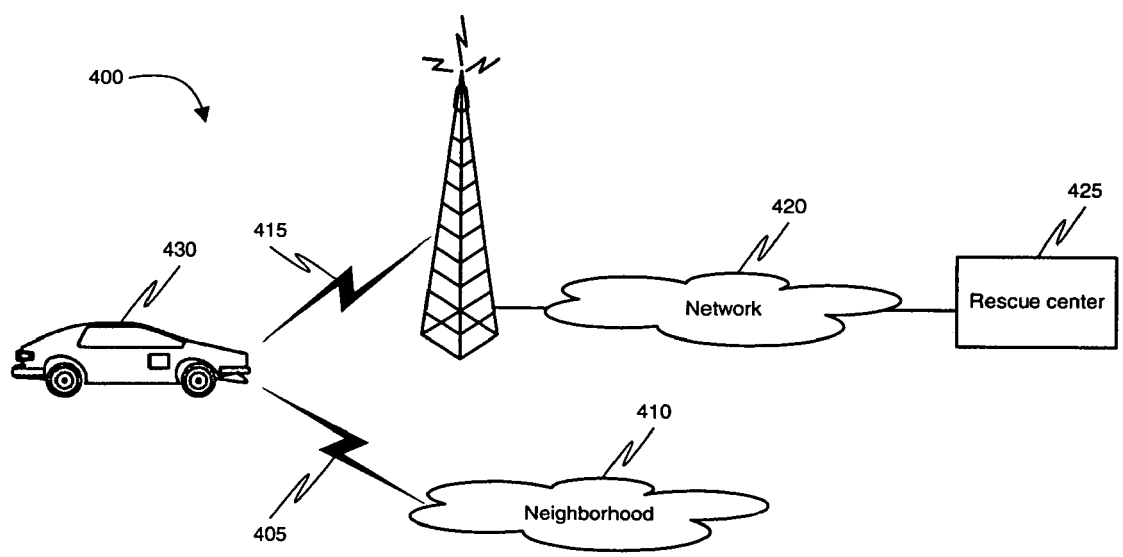
FIG. 4 illustrates a warning system to issue a warning about a presence of a non-autonomous entity when a predetermined condition exists in accordance with embodiments of the present invention.

Referring now to FIG. 4, a warning system 400 issues a warning about a presence of a non-autonomous entity within a vehicle 430 when a predetermined condition exists. In one embodiment, the warning system 400 comprises a local warning module 120 that is directed toward an immediate neighborhood 410 of a vehicle 430. The local warning module 120 has the objective to capture an attention of somebody around the vehicle. The local warning module 120 may include a local alarm 405 that generates a loud sound, which may be different from a regular sound generated by an antitheft system or a similar gadget. The local alarm 405 may also be in a form of pre-recorded synthesized message such as "Help".

In another embodiment, the warning system 400 may also comprise a remote alarm transmitter that sends a wireless transmission 415 to a remote location 425, using a network 420. The remote location 425 may be a third party rescuing mechanism such as a police service, or an equivalent emergency service provider, or a predefined remote recipient, such as a pre-programmed telephone number.

In a further embodiment of the present invention, when the system 125 detects a presence of an non-autonomous entity in a parked vehicle, besides issuing an alarm, the system 125 may comprise a rescue module 135 that is configured to modify a condition in a vehicle. For instance, a condition in the vehicle that may adversely affect a non-autonomous entity is an extreme temperature inside the vehicle. Therefore, in one embodiment, the system 125 can measure the temperature inside the vehicle and in case the temperature is above or below a predefined value, the system 125 can be configured to adjust the temperature to a comfortable temperature. For instance, the rescue module 135 may be configured to automatically open the vehicle windows or activate a cooling or heating fan, depending on the determined condition. In another embodiment of the present invention, a condition that can be monitored and controlled by the rescue module 135 is a state of an engine (not shown). If the system detects that the engine is not switched off since a predefined period of time, while the vehicle is not moving and has a non-autonomous entity, the system can turn off the engine and open a window of the vehicle, in order to avoid or stop effects of an intoxication.

Figure 5:
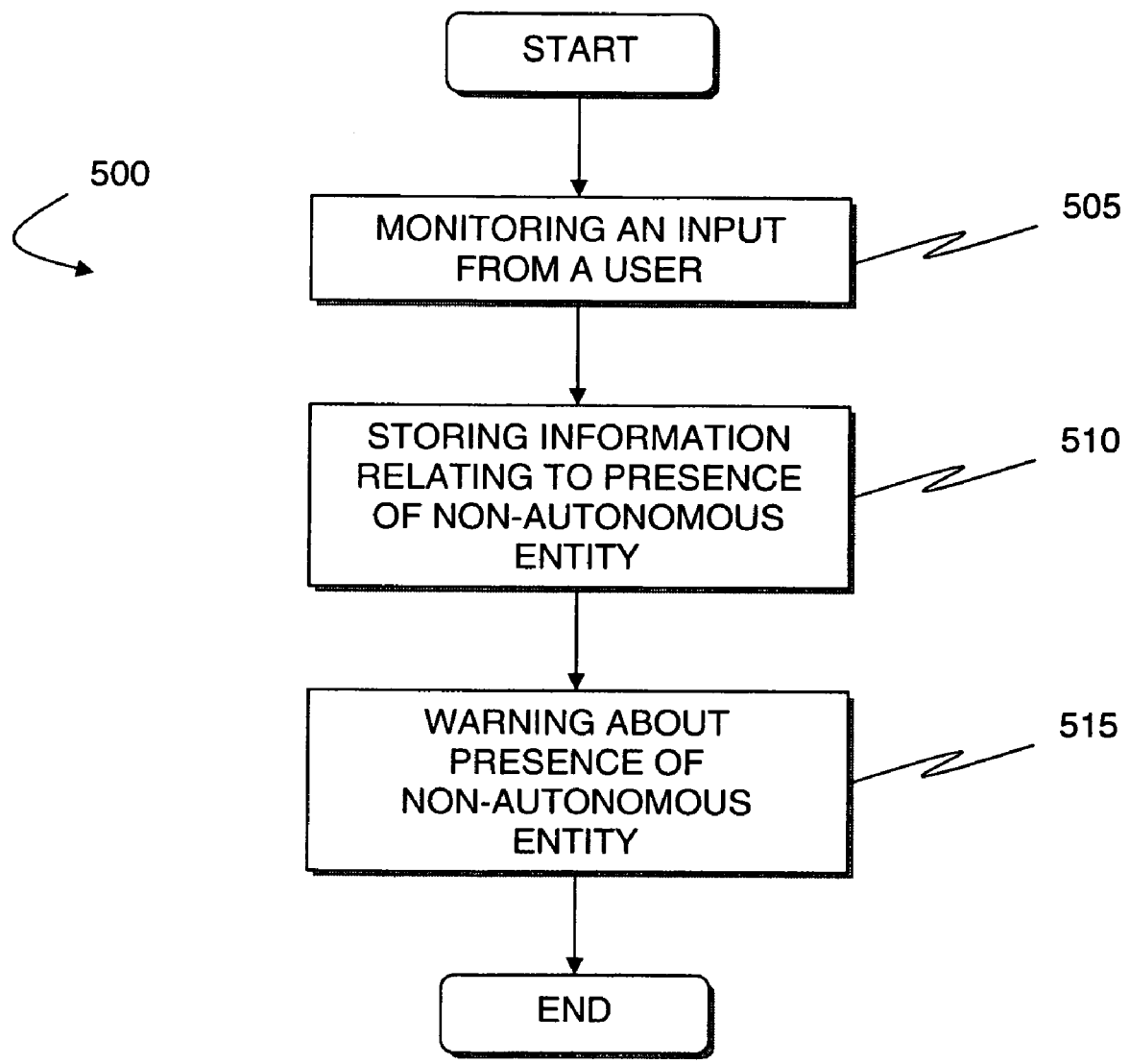
FIG. 5 illustrates a flow diagram of one embodiment of a method of increasing safety to occupants in a vehicle in accordance with embodiments of the present invention.

Referring now to FIG. 5, a flow diagram 500 is shown that illustrates one embodiment of a method for increasing safety to occupants in a vehicle. The method comprises a step 505 of monitoring an input from a user that identifies a presence of a non-autonomous entity inside the vehicle. The user can be a driver of the vehicle or a person who is present in the vehicle. The non-autonomous entity can be an infant, or a handicapped or an unconscious person and can also include a file forgotten in the vehicle or a pet animal.

In one embodiment, an input from a user can be obtained by receiving a signal from a push button 205. The push button 205 can comprise of an active state and an inactive state. The active state can be a state when the push button 205 is pressed, signifying the presence of a non-autonomous entity in a vehicle. The user can be prompted to press the push button 205 either when an engine of the vehicle has been stopped or a door of the vehicle has opened. The user can be prompted to press the push button 205 by either by flashing a light in the push button 205 or by a voice that informs the user to press the push button 205. The press of the push button 205 would signify that presence of the non-autonomous entity in the vehicle. In another embodiment of the invention, the input can comprise of a microphone 210 and a voice recognition module 215 that are configured to process a verbal identification of the presence of the non-autonomous entity in the vehicle. The voice recognition module 215 may comprise a speech-to-text converter (not shown) that converts a voice signal to a corresponding text for easy storage later.

In yet another embodiment of the invention, the input can comprise at least one sensor 305 associated with a seat belt 310 of the non-autonomous entity. The sensor 305 detects and studies whether the seat belt 310 has been fastened. This information does not mean that the non-autonomous person is inside the vehicle, but can eventually help, when the car is parked or lengthily started but not moving, to check if the seat belt is still fastened for a predetermined period of time. In such a case, it could be assumed that an occupant of the vehicle could have become non-autonomous.

As explained above, the user input can be provided in the vehicle. Those of skill in the art with the benefit of this specification would appreciate that the methods mentioned here for the input and to prompt the user for the input are not exhaustive and the input can be monitored by various other methods, whether within the vehicle or outside it. For example, a further embodiment of the invention could comprise the input being provided by a vehicle locking system, and the user may be prompted for the input when the user presses a key to lock the vehicle. When an appropriate button is pressed on the vehicle locking system, the method of providing the safety to the occupants in the vehicle can be activated.

The method may further include the step 510 of storing the information relating to the presence of a non-autonomous entity. This can be accomplished by storing information and other data received from the user input 105 and learning module 110 in a storage 115. In an embodiment where an input comprises a press button 205, the storing of information can include memorizing the pressed position of the button 205 and therefore the presence of the non-autonomous entity in the vehicle. In an embodiment where the input comprises a seat belt sensor 305, the storing of information can include memorizing a seat belt 310 that has been fastened. In an embodiment where the input comprises a voice recognition system 215 that records a voice of the occupant, a speech to text converter helps memorize the voice of the occupant by storing it in text form in storage 115 thereby reducing storage capacity requirements. Those of skill in the art having the benefit of this specification would appreciate that the methods mentioned here for storing the information in relation to the input are not exhaustive and the storage can be implemented by various other methods.

The method shown in FIG. 5 may further include the step 515 of warning the user about the presence of the non-autonomous entity when a predetermined condition exists. As mentioned above, in one embodiment, the predetermined condition may include a predetermined time after the vehicle is in a stationary position and a seat belt associated with the non-autonomous entity is in an unreleased state. As discussed earlier, the unreleased state of the seat belt may be an indicator of an occupant, who may not be a non-autonomous entity, but has become non-autonomous due to unconsciousness or such other reason. The predetermined condition may also include an open state of a door of the vehicle. The warning may be a local alarm or a remote alarm. The local alarm may be an audible alarm external to the vehicle. The local alarm may be directed toward an immediate neighborhood 410 of the vehicle, with an objective to capture an attention of somebody around the vehicle. The remote alarm may include transmitting a wireless message to a remote location 425 using a network 420. The remote location 425 can be a rescue center that can provide a rescue operation to prevent the hazardous consequences. Apart from the alarm, as explained earlier, the system 125 can further provide rescue measures to control a condition in the vehicle (such as a temperature or exhaust gases).

Figure 6:
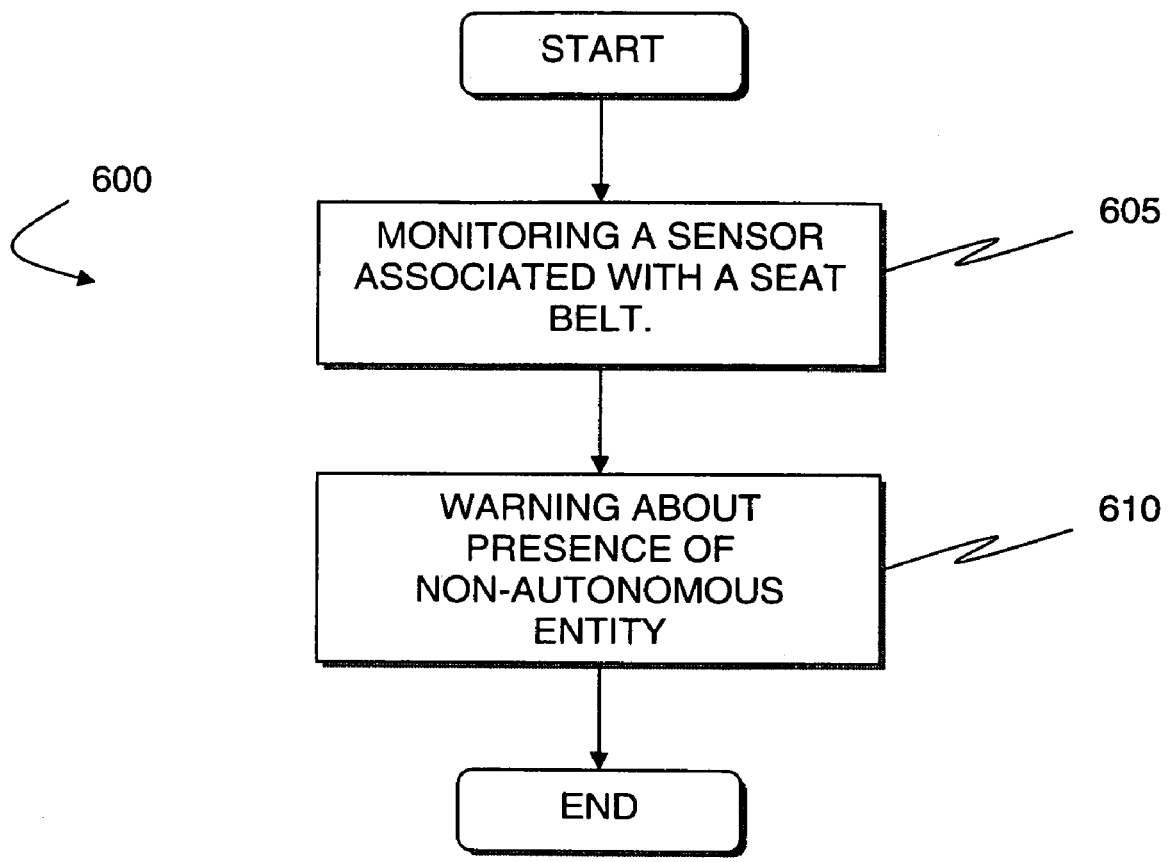
FIG. 6 illustrates a flow diagram of another embodiment of a method of increasing safety to occupants in a vehicle in accordance with embodiments of the present invention.

Referring now to FIG. 6, that illustrates a flow diagram 600 of another method of increasing safety to occupants in a vehicle. At step 605, the system 125 monitors a sensor associated with a passenger belt of a vehicle for a predetermined time after an engine in the vehicle is turned off. If the sensor associated with the passenger seat belt of the vehicle indicates that the seat belt is in an unreleased state after the predetermined time, after the engine in the vehicle is turned off, as depicted in step 610, the system 125 warns the driver of the vehicle about a presence of a non-autonomous entity. The system 125 may warn the driver after the driver opens a door of the vehicle. The system 125 can warn the driver by turning on a visual graphic 220 on a dashboard optionally accompanied by an audible alarm. Further, a warning can comprise transmitting a wireless message to a remote location.

What is claimed is:

1. A method of increasing safety to occupants in a vehicle, the method comprising steps of:
   monitoring an input from a user that identifies a presence of a non-autonomous entity;
   storing information relating to the presence of the non-autonomous entity; and,
   warning the user about the presence of the non-autonomous entity when a predetermined condition exists, wherein the predetermined condition includes one of the following:
   a predetermined time after the vehicle is in a stationary position and a seat belt associated with the non-autonomous entity is in an unreleased state, or an open state of a door of the vehicle.

2. The method of claim 1 further comprising the step of prompting the user to identify whether the non-autonomous entity is located within the vehicle.

3. The method of claim 1 wherein the input is a push button having an active state and an inactive state, the active state allowing the user to identify the presence of the non-autonomous entity.

4. The method of claim 3 further comprising the step of prompting the user to identify whether the non-autonomous entity is located within the vehicle, the prompting step including at least flashing a light in the push button.

5. The method of claim 1 wherein the input comprises a microphone and a voice recognition module that are configured to process a verbal identification of the presence of the non-autonomous entity by the user.

6. The method of claim 1 wherein the information stored relating to the presence of the non-autonomous entity includes data from at least one sensor associated with a seat of the non-autonomous entity.

7. The method of claim 1 wherein the step of warning the user includes generating an audible alarm external to the vehicle.

8. The method of claim 1 wherein the step of warning the user includes transmitting a wireless message to a remote location.

9. A method of increasing safety to occupants in a vehicle, the method comprising steps of:
   monitoring a sensor associated with a passenger seat belt of the vehicle for a predetermined time after an engine in the vehicle is turned off; and
   warning a driver of the vehicle about a presence of a non-autonomous entity if the sensor associated with the passenger seat belt of the vehicle indicates that the seat belt is in an unreleased state after the predetermined time after the engine in the vehicle is turned off.

10. The method of claim 9 wherein the step of warning a driver occurs after the driver opens a door of the vehicle.

11. The method of claim 9 wherein the step of warning the user includes generating an audible alarm external to the vehicle.

12. The method of claim 9 wherein the step of warning the user includes transmitting a wireless message to a remote location.

13. A system for increasing safety of a non-autonomous entity in a vehicle, the system comprising:

a user input that is configured to allow a driver of the vehicle to identify a presence of the non-autonomous entity;

a learning module that stores information relating to the presence of the non-autonomous entity, wherein the learning module is configured to receive data from a seat belt sensor that identifies whether a seat belt is in a fastened or unfastened state; and a warning module configured to issue a warning about the presence of the non-autonomous entity when a predetermined condition exists.

14. The system of claim 13, wherein the user input comprises a button for registering the presence of the non-autonomous entity.

15. The system of claim 13, wherein the user input comprises a microphone and a voice recognition module that are configured to process a verbal identification of the presence of the non-autonomous entity.

16. The system of claim 13, wherein the warning module comprises at least one of a local alarm and a remote alarm.

17. The system of claim 13, wherein the system further comprises a rescue module that is configured to automatically modify a condition in the vehicle after the warning step.

* * * * *